United States Patent
Gam et al.

[11] Patent Number: 6,127,915
[45] Date of Patent: Oct. 3, 2000

[54] HIGH TEMPERATURE PLATINUM RESISTANCE THERMOMETER AND METHOD OF PRODUCING SUCH

[75] Inventors: Kee Sool Gam; Yong Gyoo Kim; Kee Hoon Kang, all of Taejon, Rep. of Korea

[73] Assignee: Korea Research Institute of Standards and Science, Taejon, Rep. of Korea

[21] Appl. No.: 09/275,418

[22] Filed: Mar. 24, 1999

Related U.S. Application Data

[63] Continuation-in-part of application No. 08/886,511, Jul. 1, 1997, abandoned.

[30] Foreign Application Priority Data

Mar. 19, 1997 [KR] Rep. of Korea .................. 97-9382

[51] Int. Cl.[7] .................................................. H01C 3/04
[52] U.S. Cl. .......................... 338/28; 338/25; 338/279; 374/185; 374/208
[58] Field of Search .................................. 338/22 R, 25, 338/28, 279; 274/185, 208

[56] References Cited

U.S. PATENT DOCUMENTS 2,780,703  2/1957  Macintyre .................. 338/28
4,882,571  11/1989 Hori et al. .................. 338/28

FOREIGN PATENT DOCUMENTS 833665   2/1952  Germany .................. 338/25
5543427  3/1980  Japan ...................... 338/28

OTHER PUBLICATIONS

H. Preston–Thomas et al., "Supplementary Information For The International Temperature Scale of 1990", Dec. 1990, pp. I and 103–106.

*Primary Examiner*—Karl Easthom
*Attorney, Agent, or Firm*—Jacobson, Price, Holman & Stern, PLLC

[57] ABSTRACT

A high temperature platinum resistance thermometer and a method of producing such a thermometer. Both a sensor frame and a protective tube are made of mon-crystalline synthetic sapphire, which has a melting point of about 2050° C. and effectively prevents vaporized metal from transmitting through it. The thermometer is thus effectively operated at a high temperature up to about 1500° C. The thermometer is also provided with platinum wires capable of measuring insulating resistance, thus effectively compensating for measuring errors caused by such an insulating resistance.

5 Claims, 4 Drawing Sheets

HIGH TEMPERATURE PLATINUM RESISTANCE THERMOMETER AND METHOD OF PRODUCING SUCH

This is a Continuation-In-Part of application Ser. No. 08/886,511 filed Jul. 1, 1997 now abandoned.

BACKGROUND OF THE INVENTION

1. Field of the Invention

The present invention relates, in general, to a high temperature platinum resistance thermometer and a method of producing such a thermometer and, more particularly, to a high temperature platinum resistance thermometer capable of being operated at a high temperature up to 1500° C. in addition to compensating for measuring errors caused by an insulating resistance.

2. Description of the Prior Art

In a typical high temperature platinum resistance thermometer, both the sensor frame and the protective tube are made of silica glass so that the effective operational temperature of the thermometer is limited to about 1100° C., which is the softening point of the silica glass. The typical thermometer has four lead wires so that it regrettably fails to measure leaking current at a high temperature. The silica glass easily transmits vaporized metal at a high temperature so that the platinum resistance thermometer may be easily contaminated by the vaporized metal.

SUMMARY OF THE INVENTION

Accordingly, the present invention has been made keeping in mind the above problems occurring in the prior art, and an object of the present invention is to provide a high temperature platinum resistance thermometer, which is effectively operated at a high temperature up to about 1500° C. and is provided with platinum wires capable of measuring insulating resistance, thus effectively compensating measuring errors caused by such an insulating resistance.

Another object of the present invention is to provide a method of producing such a high temperature platinum resistance thermometer.

In an aspect, the present invention provides a high temperature platinum resistance thermometer, comprising: a sensor unit including a sensor frame having an X-shaped cross-section and two platinum coils wound around the sensor frame to form a double coil structure; four platinum lead wires welded to and extending from the sensor unit; a platinum support wire extending from the sensor unit to support the weight of the sensor unit and to measure insulating resistance; a spacer having a plurality of peripheral holes for allowing the platinum lead wires to pass through and a center hole for allowing the platinum support wire to pass through; an insulting tube fitted into the center hole of the spacer with the support wire passing through the insulating tube; and a protective tube sealed by a Pyrex™ ("A trademark for a glass having a very low coefficient of expansion. It contains 80 percent silica, and 12 percent boric oxide", W. Gardner et al., Handbook of Chemical Synonyms and Tradenames, 8$^{th}$ Edition, Page 588, 1971) tube and adapted for holding the platinum lead and support wires after the wires pass through the spacer.

In the high temperature platinum resistance thermometer, the sensor frame, protective tube, spacer and insulating tube are all made of mono-crystalline synthetic sapphire material.

The thermometer has a maximum effective operational temperature up to about 1500° C. and a temperature resolution error within ±0.01° C.

The sensor frame is provided with a thread on its outside wall for allowing the platinum coils to be wound around the frame to form the double coil structure.

The spacer has four peripheral holes for allowing the four platinum lead wires to pass through them and one center hole for allowing the platinum support wire to pass through it, each of the lead and support wires having a diameter of 0.5 mm.

The platinum support wire holds the weight of the sensor unit and measures the insulating resistance.

The protective tube is connected to the Pyrex™ tube using high vacuum epoxy resin, while the platinum lead and support wires are led to the outside through the five holes of the Pyrex™ tube prior to sealing the gaps between the wires and the holes of the Pyrex™ tube with vacuum epoxy resin.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
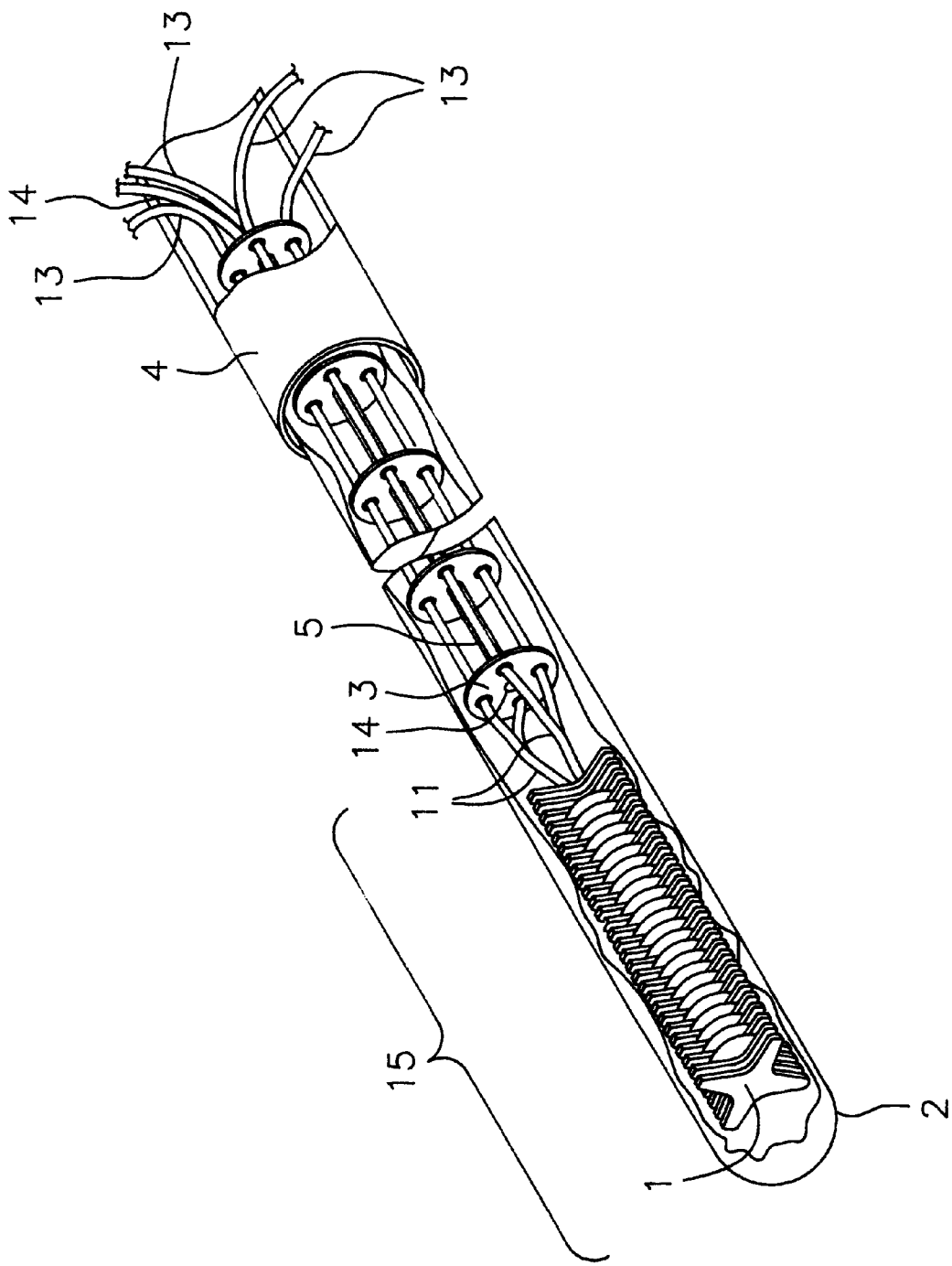
FIG. 1 is a perspective view of the high temperature platinum resistance thermometer according to the preferred embodiment of the present invention.

FIG. 1 illustrates the high temperature platinum resistance thermometer according to the preferred embodiment of the present invention. The sensor unit 15 includes a sensor frame 1 having an X-shaped cross-section. The sensor frame 1 can be made of sapphire. Two platinum coils 11 are wound around the sensor frame 1 to form a double coil structure. The sensor frame 1 and the two platinum coils 11 constitute the sensor unit 15.

Four platinum lead wires 13 are welded to and extended from the sensor unit 15. Two of the four platinum lead wires 13 are welded to each of the two platinum coils 11, respectively. A platinum support wire 14 is extended from the sensor unit 15 to hold the weight of the sensor unit 15 and to measure insulation resistance. A spacer 3 has a plurality of peripheral holes for allowing the platinum lead wires 13 to pass through and a center hole for allowing the platinum support wire 14 to pass through.

The spacer 3 is also made of sapphire. Within a protective tube 2, a plurality of spacers 3 are provided, as shown in FIG. 1, in order to orderly allow the platinum lead wires 13 and the platinum support wire 14 to pass through.

An insulating tube 5 is provided in the center of the thermometer and is fitted into the center hole of the spacer 3. The support wire 14 pass through the insulating tube 5.

A protective tube 2 is sealed by a Pyrex™ tube 4 and adapted for holding the platinum support wire 14 and the platinum lead wires 13.

In the high temperature platinum resistance thermometer according to this invention, both the sensor frame 1 and the protective tube 2 are made of mono-crystalline synthetic sapphire material, which has a melting point of about 2050° C. and effectively prevents vaporized metal from transmitting through it due to the mono-crystalline structure. The thermometer of this invention is thus effectively operated at a high temperature up to about 1500° C.

Figure 2A:
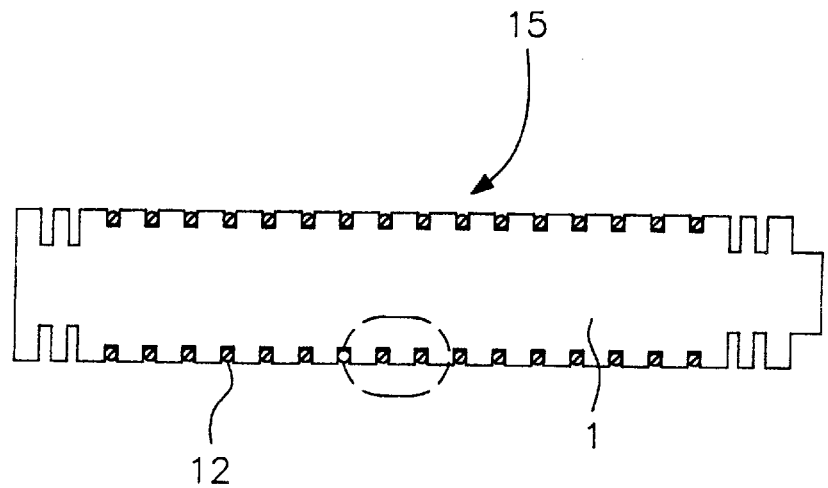
FIGS. 2A and 2B are views showing the construction and configuration of a sensor unit, with two platinum coils being wound around a sapphire sensor frame into a double coil, of the high temperature platinum resistance thermometer in accordance with the preferred embodiment of the present invention.
Figure 2B:
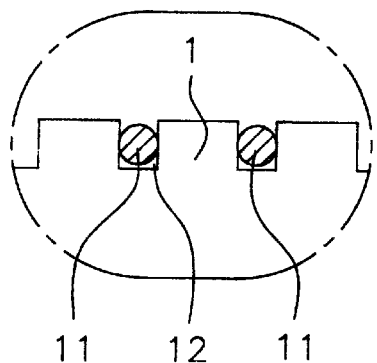
Figure 3:
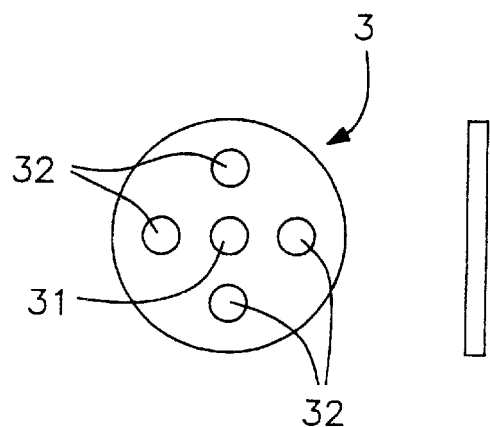
FIG. 3 is a view showing a sapphire spacer included in the thermometer of this invention.
Figure 4:
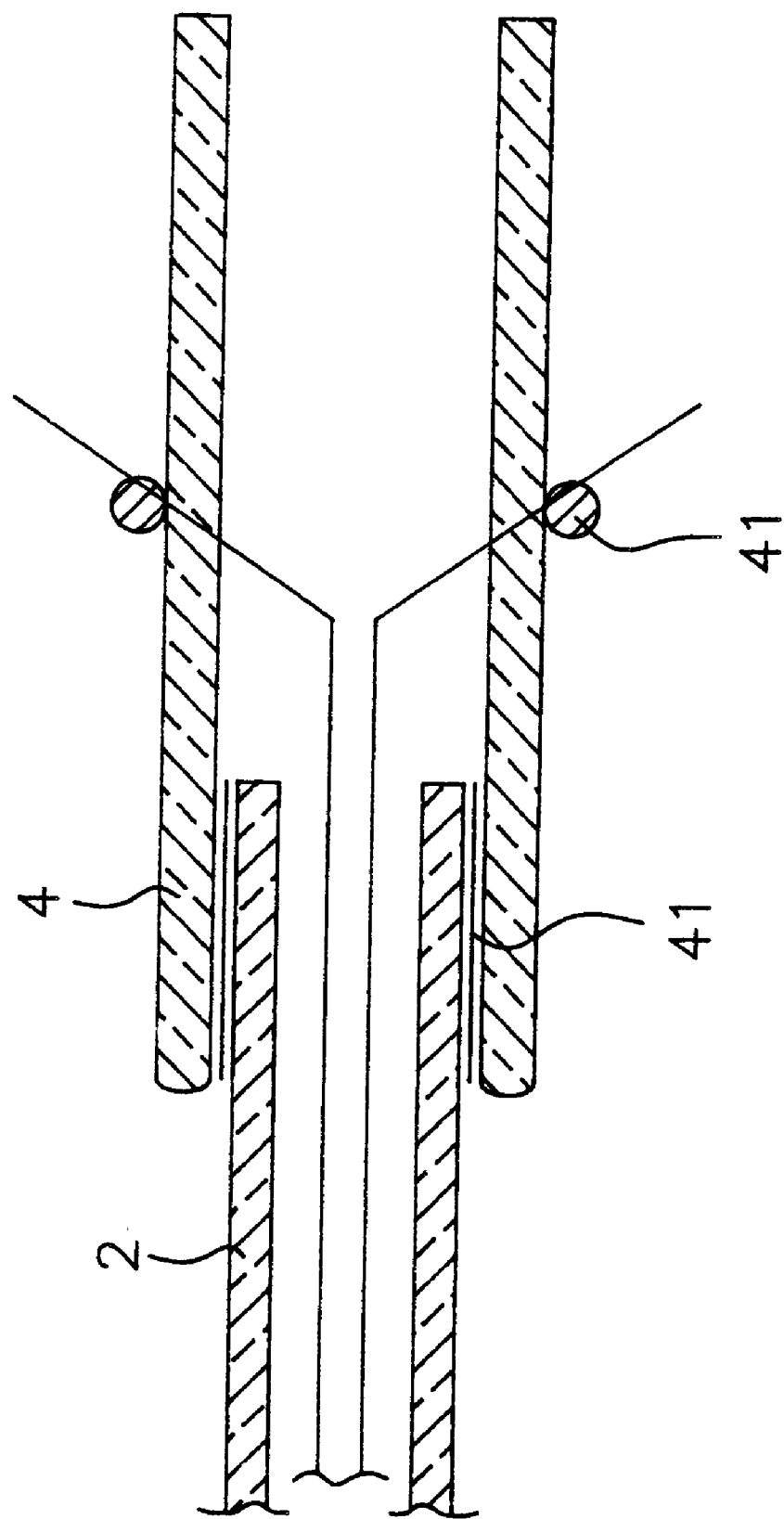
FIG. 4 is a sectional view showing the junction between the protective tube and the Pyrex™ tube of the thermometer according to this invention.

FIGS. 2A and 2B show the construction and configuration of a sensor unit 15 of the high temperature platinum resistance thermometer of this invention, with two platinum coils 11 being wound around the sapphire sensor frame 1 to form a double coil structure. FIG. 3 shows a sapphire spacer of the above thermometer. FIG. 4 shows the junction between the protective tube 2 and the Pyrex™ tube of the thermometer.

As shown in FIGS. 2A, 2B and 3, the sapphire sensor frame 1, which is the most important part of the thermometer of this invention, is formed by cutting a sapphire rod having an X-shaped cross-section using a diamond cutter into a specified configuration suitable for allowing the platinum coils 11, individually having a diameter of 0.5 mm, to be wound around the frame 15 times to form a double coil sensor unit 15. The sapphire spacer 3, which is used for spacing four platinum lead wires 13 and one platinum support wire 14 from each other, are formed by cutting a sapphire rod having five axial holes: one center hole 31 and four peripheral holes 32. After machining sapphire parts such as the sensor frame 1, the protective tube 2 and the spacer 3, they are primarily washed in soapy water and are rinsed in distilled water so that impurities are removed from them. The sapphire parts are, thereafter, secondarily washed using an ultrasonic washer in HF acid for at least 10 minutes prior to finally washing them in flowing distilled water.

Four platinum wires 13, individually having a high purity of 99.999% and a diameter of 0.5 mm, are welded to the sensor frame 1 using a water welder. The four platinum lead wires 13 extending from the sensor unit 15 pass through the peripheral holes 32 of the spacer 3, thus being effectively spaced apart from each other and being prevented from unexpectedly coming into contact with each other. A platinum support wire 14 passes through the center hole 31 of the sapphire spacer 3. The above platinum support wire not only measures insulation resistance, it also supports the weight of the sensor unit 15. In order to insulate the support wire from the spacer 3, an insulation tube 5 having a length of 3 cm is fitted into the center hole 31 of the spacer 3 with the support wire passing through the insulating tube 5.

The sensor unit 15 assembled with the lead wires is, thereafter, continuously washed by a steam washer for one week. The sensor unit 15 with the lead wires is installed in the protective tube 2. The protective tube 2 is washed prior to installation of the sensor unit 15 and has an outer diameter of 7.0 mm, an inner diameter of 5.0 mm and a length of 50 cm. The protective tube 2 is connected to a vacuum pump using both a Pyrex™ tube 4 and a high vacuum caulking material. The Pyrex™ tube 4 is connected to the protective tube 2 using a high vacuum bonding agent. In order to lead both the four lead wires 13 and the single support wire 14 to the outside of the Pyrex™ tube 4, five holes are formed on the Pyrex™ tube 4. The gap between each of te platinum lead and support wires and an associated hole of the Pyrex™ tube 4 is sealed using high vacuum epoxy resin 41. At 1500° C. or the maximum operational temperature of the thermometer of this invention, the linear expansion of a platinum wire having a length of 450 mm is 6.1 mm. The length (40 cm) of each lead wire is determined in consideration of both the above linear expansion of the platinum wire and the length of the sensor unit 15. The assembled thermometer is, thereafter, filled with high purity argon gas using a gas injector under a pressure of 142.7 torr at room temperature so that the thermometer has an internal pressure of 1.2 atm. at a temperature of 1500° C. Prior to injecting the argon gas into the thermometer, high purity argon gas passes through the interior of the thermometer three times while heating the sensor unit 15 using a dryer at a pressure of $3 \times 10^{-7}$ torr, thus completely removing moisture from the interior wall of the protective tube 2, the other sapphire parts and the platinum wires. The thermometer is heated at a temperature of 475° C. for 4 hours prior to measuring the resistance characteristic of the thermometer at low fixed points of metals such as Zn (zinc), Sn (tin) and Ga (gallium) and at a triple point of water and is heated at a temperature of 1500° C. for 5 hours prior to comparatively measuring the resistance characteristic of the thermometer at temperatures up to 1500° C.

Resistance of the thermometer of this invention at the triple point of water is 0.13 Ω. In the above thermometer, the sensing terminal is hung on the platinum lead wires thus having a strain-free structure. Therefore, the thermometer of this intention is from resistance variation caused by strain even when the platinum lead wires 13 thermally expand at a high temperature. The present invention produces a high temperature platinum resistance thermometer, which can be effectively used at a high temperature up to 1500° C. and has a temperature resolution error ranging within ±0.01° C.

The high temperature platinum resistance thermometer of this invention and a method of producing such a thermometer will be described in detail through the following examples which are set forth to illustrate, but are not to be construed as the limit of the present invention.

EXAMPLE 1

Resistance of the high temperature platinum resistance thermometer of this invention was repeatedly measured at the triple point of water and fixed points of metals (Ga, Sn, Zn, Al, Ag and Cu) thus measuring the temperature-resistance characteristic of the thermometer. While measuring the resistance of the thermometer, the fixed points of the metals were formed by a conventional fixed point system. The measuring of resistance was carried out with bridge Model No. F18 AC produced by ASL Company. The frequency of the above bridge was fixed to a low level of 25 Hz, while the electric current was 20 mA. At each of the fixed points of the metals, resistance was calculated by the expression, $W(t)=R(t)/R(TP)$, using the triple point of water approximate to each fixed point. In order to remove production strain from the platinum wires of the sensor unit, the thermometer was heated to a temperature of 475° for 4 hours. After the heating treatment, both the fixed point of gallium and the triple point of water were measured prior to calculating the resistance ratio at the fixed point of gallium. In this case, the resistance ratio measured at the fixed point of gallium was 1.1181234, which was higher than the reference resistance ratio (1.11807) at the fixed point of gallium measured by a standard platinum resistance thermometer expressed in the international temperature scale of 1990 (ITS-90). Therefore, it was apparent that the grade of the thermometer of this invention is not lower than the standard platinum resistance thermometer. Resistance measured by the thermometer of this invention at the triple point of water was remarkably reduced after the thermometer was subjected to the above-described heat treatment. That is, such a heat treatment for the thermometer at 475° C. effectively removed production strain from the platinum wires of the sensor unit. While measuring resistance at the fixed point of each metal, the temperature resolution error of the thermometer is ranged within ±1 mK. In addition, the correction results performed by the thermometer of this invention were almost equal to the characteristics of a conventional platinum resistance thermometer.

EXAMPLE 2

Figure 5:
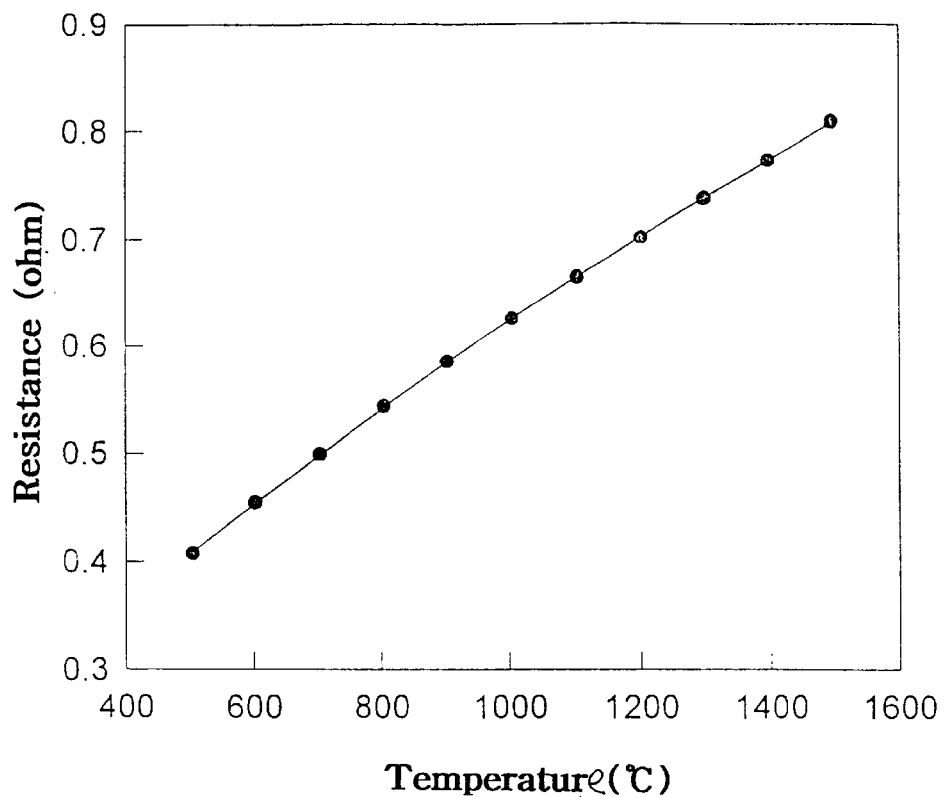
FIG. 5 is a graph showing resistance as a function of temperature for the thermometer of this invention.
Figure 6:
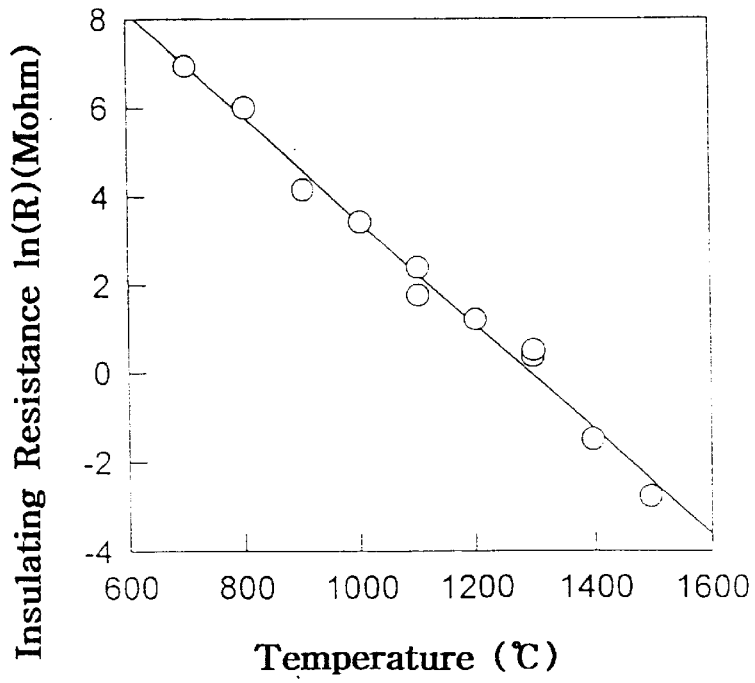
FIG. 6 is a graph showing insulating resistance as a function of temperature for the thermometer of this invention.

After the thermometer of this invention along with an S-type thermocouple was installed inside a vertical high temperature electric furnace prior to measuring resistance variation while raising the temperature from 500° C. to 1500° C. stepwise at an interval of 100° C. In order to reduce the measuring errors of the thermometer inside of the high temperature electric furnace, both the thermometer and the thermocouple were installed in the furnace with both the middle portion of the thermometer and the contact terminal of the thermocouple being commonly located at a position higher than the highest temperature surface inside of the furnace by 38 cm. The above thermocouple was comparatively corrected in a black body furnace with both a corrected fixed point and a corrected radiant thermometer and has a measuring error within ±1.0° C. at temperatures of 0° C.–1500° C. FIG. 5 is a graph showing resistance as a function of temperature for the thermometer of this invention at temperatures of 500° C.–1500° C. In the temperatures of 500° C.–1500° C., the resistance measuring resolving power (dR/dt) is $3.3684 \times 10^{-4}$ $\Omega°$ $C.^{-1}$, which can be converted into a temperature of ±8.9 mK. Therefore, the thermometer of this invention with a conventional measuring system can measure a high temperature with the precision of ±10 mK. As showing in FIG. 5, the solid line calculated through the method of least squares meets measured data. In addition, the temperature-resistance characteristic of platinum at a high temperature meets a quadratic equation. FIG. 6 is a graph showing the insulating resistance as a function of temperature for the thermometer of this invention. In a temperature of lower than 600° C., it was impossible to measure the insulating resistance because the insulating resistance exceeded the measuring range of DMM (HP 3458A). Therefore, the measuring of the insulating resistance was carried out at a measurable temperature range. The insulating resistance was exponentially reduced in inverse proportion to temperature. At a temperature of 1500° C., the insulating resistance was 0.063 MΩ so that the effect of the insulating resistance upon the thermometer resistance is 0.0012% of the measured resistance.

As described above, the present invention provides a high temperature platinum resistance thermometer and a method of producing such a thermometer. In the high temperature platinum resistance thermometer of this invention, both the sensor frame 1 and the protective tube 2 are made of mono-crystalline synthetic sapphire, which has a melting point of about 2050° C. and effectively prevents vaporized metal from transmitting through it. The thermometer is thus effectively operated at a high temperature up to about 1500° C. The thermometer is also provided with platinum wires capable of measuring insulating resistance, thus effectively compensating for measuring errors caused by such an insulating resistance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high temperature platinum resistance thermometer, comprising:
    a sensor unit including:
        a sensor frame having an X-shaped cross-section; and
        two platinum coils wound around the sensor frame to form a double coil structure;
        four platinum lead wires welded to and extending from said sensor unit, two of the four platinum lead wires welded to each of the two platinum coils, respectively;
        a platinum support wire for measuring insulating resistance;
        a spacer having a plurality of peripheral holes through which the platinum lead wires pass and a center hole through which the platinum support wire pass;
        an insulating tube fitted into said center hole of the spacer with the support wire passing through the insulating tube; and
        a protective tube sealed by a glass tube having a very low coefficient of expansion.

2. The high temperature platinum resistance thermometer according to claim 1, wherein said sensor frame, protective tube, spacer and insulating tube are all consisted of mono-crystalline synthetic sapphire material.

3. The high temperature platinum resistance thermometer according to claim 1, wherein said thermometer has an effective operational temperature up to about 1500° C. and a temperature resolution error within ±0.01° C.

4. The high temperature platinum resistance thermometer according to claim 1, wherein said sensor frame includes a thread on its outside wall such that the platinum coils are winding around the frame following the thread to form a double coil structure.

5. The high temperature platinum resistance thermometer according to claim 1, wherein said spacer has four peripheral holes through which the four platinum lead wires pass and one center hole through which the platinum support wire pass, each of said lead and support wires having a diameter of 0.5 mm.

* * * * *